US005433242A

United States Patent [19]

Buchtel et al.

[11] Patent Number: 5,433,242

[45] Date of Patent: Jul. 18, 1995

[54] PRESSURE ACTIVATED DISPENSING VALVE

[75] Inventors: Dean H. Buchtel, Louisville; John A. Leonatti, Uniontown; Gerald L. Melegari, North Canton, all of Ohio

[73] Assignee: The Hoover Company, North Canton, Ohio

[21] Appl. No.: 134,641

[22] Filed: Oct. 12, 1993

[51] Int. Cl.[6] .................... F16K 24/00

[52] U.S. Cl. .................... 137/212; 137/588; 251/149.6; 222/481.5

[58] Field of Search .................... 137/212, 588; 251/149.6; 222/481.5, 482

[56] References Cited

U.S. PATENT DOCUMENTS

| | | | |
|---|---|---|---|
| 194,508 | 8/1877 | Aenis | 137/212 |
| 341,555 | 5/1886 | Collins et al. | 137/212 X |
| 517,305 | 3/1927 | Schlueter et al. | |
| 1,736,446 | 11/1929 | Keefer | |
| 2,444,677 | 7/1948 | Rosenblum | 138/45 |
| 2,661,018 | 12/1953 | Snyder | 222/481.5 X |
| 2,661,019 | 12/1953 | Snyder et al. | 137/588 X |
| 3,040,362 | 6/1962 | Krammes | 15/320 |
| 3,060,484 | 10/1962 | Krammes | 15/320 |
| 3,118,468 | 1/1964 | Bochan | 137/525.1 |
| 3,127,631 | 4/1964 | Hershberger et al. | 15/588 |
| 3,155,110 | 11/1964 | Hoffman | 137/493.1 |
| 3,173,165 | 3/1965 | Speight | 15/533 |
| 3,720,977 | 3/1973 | Brychi | 15/321 |
| 4,260,074 | 4/1981 | Lerrato | 222/481.5 X |
| 4,558,484 | 12/1985 | Groth | 15/320 |
| 4,926,908 | 5/1990 | Dshida | 137/846 |
| 5,249,598 | 10/1993 | Schmidt | 137/493.1 |

FOREIGN PATENT DOCUMENTS

| | | | |
|---|---|---|---|
| 519449 | 12/1955 | Canada . | |
| 712875 | 7/1965 | Canada . | |

*Primary Examiner*—Gerald A. Michalsky

[57] ABSTRACT

A combined solution dispensing and pressurizing valve is provided so that the dispensed fluid is pressure driven to exhaust through the valve.

6 Claims, 3 Drawing Sheets

PRESSURE ACTIVATED DISPENSING VALVE

BACKGROUND OF THE INVENTION

1. Field of the Invention

This invention relates to dispensing valves and, more specifically, to a pressurized dispensing valve utilized in an extractor or the like.

2. Summary of the Prior Art

Dispensing of a solution from a closed tank, even from its bottom, requires a supply of air or other gas to the tank to prevent occurrence of a depressed pressure in the tank that retards or prevents flow from the tank. Because flow rate is a function of fluid depth, gravity alone will cause flow rate to approach zero as the tank nears empty. By applying pressure, a positive flow rate equal to or greater than a desired minimum value is assured. And by introducing the air from the bottom of the tank, you assure a more constant flow rate from full to empty.

If these two functions, gas delivery and fluid dispensing, were combined in one structure, savings such as the requirement for additional piping or the achievement of a more simple overall structure might occur.

Accordingly, it is an object of this invention to provide a combined dispensing and pressurizing valve.

It is an additional object of the invention to mount a valve within a valve to yield a pair of discrete flows.

It is an additional object of the invention to provide a composite valve structure having oppositely directed flows.

It is a further object of the invention to provide an easily mounted dispensing valve having a separate pressurizing source.

It is a still further object of the invention to provide a valve with an inner air passage surrounded by an outer fluid passage.

It is an even further object of the invention to provide an improved valve for dispensing fluids or the like.

It is an additional object of this invention to utilize an improved dispensing valve in an extractor or the like.

SUMMARY OF THE INVENTION

A dispensing valve, having as its major parts, a base, a poppet valve stem, a duckbill valve and a valve body are mated together to form two discrete flow paths for a pair of fluids such as water and air or the like so as function as a dispensing means. This dispensing means, ideally, may be utilized to dispense a cleaning fluid such as water in an extractor or the like.

The base of the valve includes an enlarged lower section having a pair of attached hoses and a pair of one way locking barbs to mount the base to the structure, e.g., an extractor, with which the valve is utilized. The base also includes a hollow, boss like, cylindrical upper section forming an actuating stem and within which is centrally located a delivery nipple. The actuating stem includes a central bore at the delivery nipple that communicates with one of the hoses while the space outwardly of this bore on the actuating stem formed by the cylindrical boss communicates with the other of these hoses.

The remainder of the valve is fixedly mounted with a closed, fluid containing tank. This tank mounted portion of the valve contains a poppet valve stem, disposed within a valve body in a bore therein, is spring urged inwardly so that with a conical section on it sealingly engages against a conical depression in the valve body. This prevents the passage of fluid through the valve body so there is no fluid discharged to the atmosphere from the tank A duckbill valve is mounted in a central bore in the poppet valve stem which is confluently communicable with the central bore of the actuating stem when the tank and valve body is mounted on the valve base. This duckbill valve generally supplies air to the tank for pressurization purposes, and self closes to prevent loss of fluid when the valve is disengaged when the tank is removed.

In the mounted position of the tank and valve body on the valve base, the poppet valve stem of the valve is urged away from the valve body by engagement of it with the actuating stem of the valve base. This opens a confluent communication between the tank and base of the valve through the valve body, between the poppet valve stem and its valve body retaining bore.

BRIEF DESCRIPTION OF THE DRAWINGS

Reference may now be had to the accompanying Drawings for a better understanding of the invention, both as to its organization and function, with the illustration showing a preferred embodiment, but being only exemplary, and in which.

DETAILED DESCRIPTIONS OF INVENTION

Figure 1:
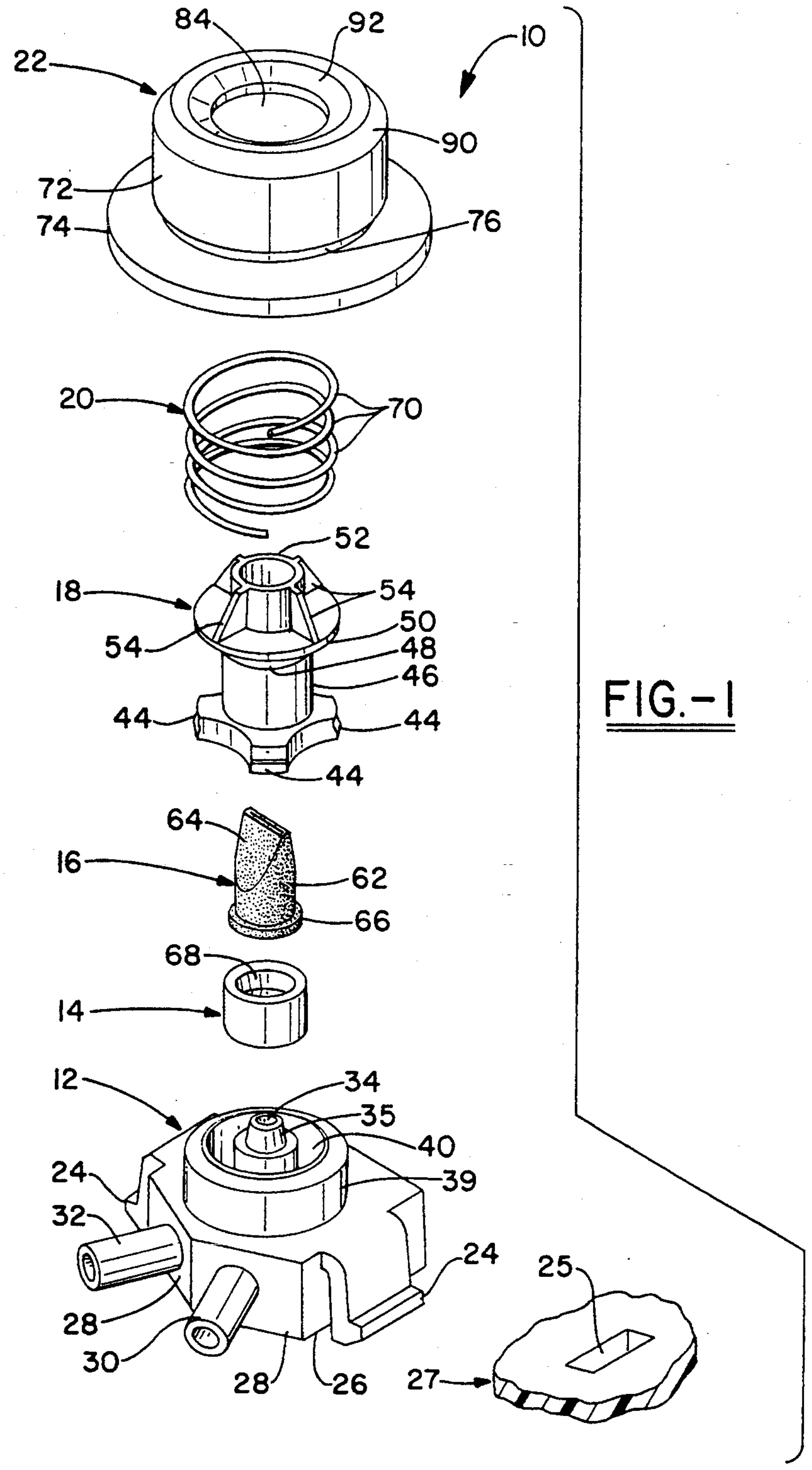
FIG. 1 is an exploded perspective view of the novel valve of this invention.

There is shown in FIG. 1 a valve structure or assembly 10 in a disassembled view. This valve assembly includes a tank valve base 12, a duckbill valve retainer 14, a duckbill valve 16, a poppet valve stem 18, a poppet valve stem urging spring 20 and a valve body 22.

The tank valve base 12, conveniently made of plastic, includes a pair of integral, opposed, one way attaching barbs 24, 24 extending from its bottom which are intended to engage in slots 25, 25 (only one seen) formed in its underlying support structure, i.e., an extractor 27 (only fragmentarily seen). It also has a flat bottom 26 to aid in this mounting.

It is generally five sided in plan view so as to provide a pair of angled adjoining walls 28, 28 from which extend integral tubes 30, 32. Tube 30 is, generally, intended to carry air as its fluid and it confluently connects with an upwardly opening, axially downwardly extending center bore 34 in a nipple-like, rounded, conical projection 35 which fluidicly seals internally against duckbill valve retainer 14 in tank valve base 12. The projection 35 communicates, by the bore 34, through a distribution channel bore 36 extending radially outwardly from the center bore and below tank valve base's top surface 38. Tube 32 is intended to carry water as its fluid and it confluently connects with a flat bottomed, fairly deep arcuate groove 40 in valve base 12. This groove is centered on the vertical axis of the valve base 12 and extends in a full circle and opens to the outer surface 38 of valve base 12 formed in a upwardly extending boss 39 of it. A distribution channel bore 42 extends radially from arcuate groove 40 within valve base 12 to confluently connect to integral tube 32. The valve boss 39 serves as the driving means which urges poppet valve stem 18 upwardly to a valve opening position.

Poppet valve stem 18 includes, at its bottom, a series of four, equally spaced, outwardly extending, somewhat curvilinear base arms 44, 44, 44, 44 (only three shown) that are integrally attached to an upwardly extending, cylindrical stem portion 46. Above the stem portion 46 is an integral conical portion 48 sloping inwardly and downwardly and having an upper rim 50 is joined integrally to stem portion 46. The conical portion 48 serves as one sealing surface for the valve arrangement 10.

Above the upper rim 50, the poppet valve stem 18 includes a second stem portion 52, slightly smaller in diameter than the stem portion 46, which has attached strengthening gussets 54, 54, 54, 54 (only three shown) which ease insertion of the poppet valve stem into valve body 22 during assembly.

These last named elements complete the structure of the poppet valve stem 18, save for a stepped, vertically extending, axial through bore 56 that runs from the top to the bottom of poppet valve stem 18. This stepped through bore includes an upper, smaller diameter bore section 58 and a lower, larger diameter bore section, 60. The purpose of this stepped bore will appear later.

The duckbill valve 16 is generally conventional and thereby resilient and elastomeric and includes a cylindrical hollow upper body section 62 that angularly merges into a duckbill portion 64. Below the cylindrical, hollow upper body section is an enlarged rim 66 which aids in the mounting of duckbill valve 16. A duckbill valve of this general nature is, e.g., described in U.S. Pat. No. 3,155,110, issued Nov. 3, 1964 and reference may be had to that patent for a more detailed understanding of this type of valve.

The valve retainer ring 14 is a hollow, bushing like generally cylindrical piece having a V-shaped (in elevational view) through bore 68 which is formed as if two cylinders each having a truncated conical bore were placed with the small ends of the bores base to base. This permits, because of the furnished cross-sectional area of retainer ring 14, a passage for airflow and a conical surface for an airtight seal. It is force or press fit into enlarged bore portion 60 of poppet valve stem 18. In this position, it maintains duckbill valve 16 within this valve stem 18 with the upper side of rim 66 of the duckbill valve 16 against the upper termination of enlarged bore 60 of the poppet valve stem 18. The upwardly extending, upper cylindrical part 62 of the duckbill valve 16 is closely surrounded by smaller upper bore 58 of poppet stem valve stepped bore 56. The through bore 68 because of the material relief at each end is, thereby, easily assembled since there is no way of inserting it the wrong way.

The compression spring 20 is provided to urge the poppet valve stem 18 to sealed condition in valve structure 10. It has coils 70 having an inner diameter larger than the outer diameter of the poppet valve stem and, in assembled condition, is disposed around the stem portion 46 of it, abutting against the base arms 44, 44, 44 and 44 at an end 71. It has a spring force of sufficient magnitude to insure proper seating of poppet valve stem 18 in valve structure 10 (FIG. 3) but not sufficient to prevent desired upseating of the poppet valve stem 18 (FIG. 2) when the valve structure 10 is placed in its fluid delivery position.

The valve body 22 is also of elastomeric material, preferably rubber, and includes a main cylindrical body 72 extending upwardly and having an enlarged lower cylindrical rim 74 extending fully around the cylindrical body. An annular groove 76 is disposed immediately above this rim and also extends fully around the main cylindrical body 72. It is formed fully in the main cylindrical body and receives elastically therein a bottom 78 of a water tank 80 (both only show fragmentarily) through the aegis of a circular opening 82 disposed in the bottom 70 of water tank 80.

The main cylindrical body 72 is hollow and when assembled is disposed so that it has an inner upwardly extending bore 84, extending upwardly from the end of its rim 74 to terminate at an inwardly extending annular lip 86 against which an upper spring end 88 of spring 20 abutting engages. This traps spring 22 between base arms 44, 44, 44, 44 of poppet valve stem 18 and lip 86 of valve body 22. The outer diameter of the coils 70 of the spring 20 are slightly smaller than the diameter of the bore 84 of valve body 22 to be guided thereby during compression and expansion.

An upper end 90 of main cylindrical body 72 of valve body 22 is chamfered completely around its cylindrical shape to make insertion of this elastomeric element into opening 82 in water tank 80 fairly easy with the bottom 78 of a closed water tank 80 elastomerically received, finally, in annular groove 76 in valve body 22. In a similar manner, angled gussets 54, 54, 54, 54 of poppet valve stem 18 make elastic assembly insertion of it into valve body 22 through the bottom of a bore 84 also fairly easy. Spring 70 is mounted over poppet valve stem 18 on base arms 44, 44, 44 prior to this insertive assembly.

The valve body 22 also includes an angled, truncated conical seat 92 at the upper end of its bore 84 to provide an abutting sealing surface for mating engagement with conical portion 48 of poppet valve stem 18.

This completes a description of the general arrangement of the valve structure or assembly 10.

Figure 2:
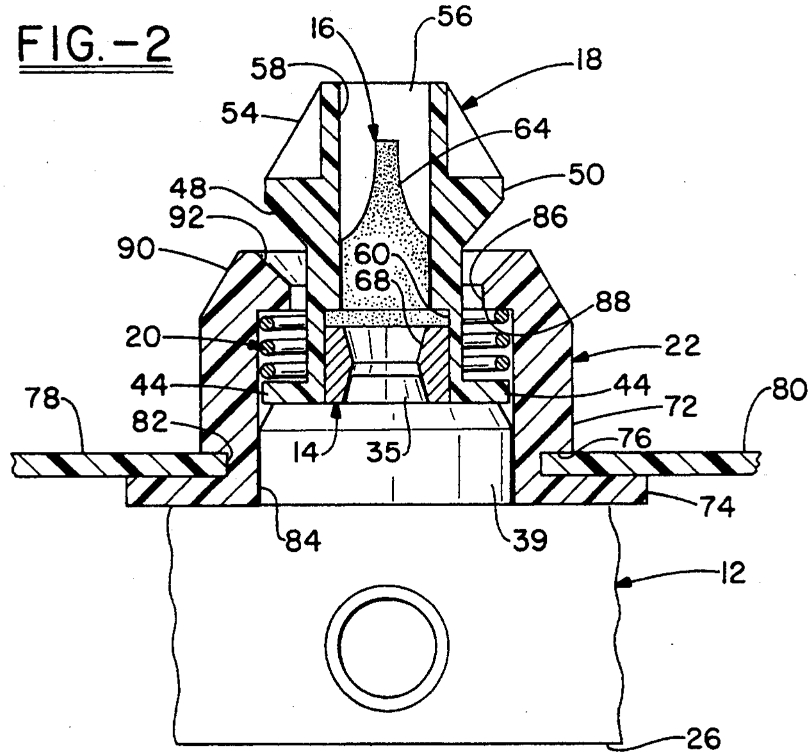
FIG. 2 is a partial cross-sectional view of the attached valve body and tank with them in mounted position on the valve base and with the valve stem open.
Figure 3:
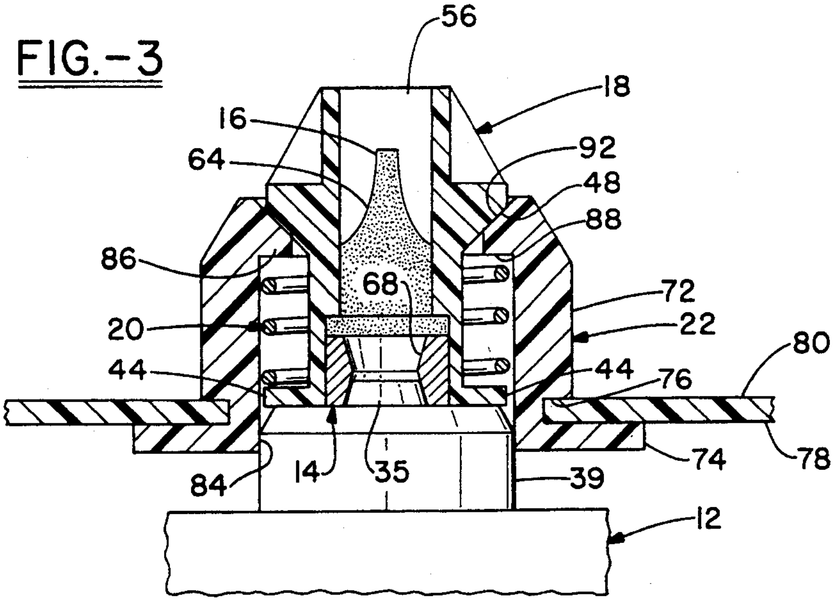
FIG. 3 is a view similar to FIG. 2 but showing the valve body and tank removed from being mounted on the valve base so that the valve stem closed.

The operation of the valve structure 10 should now be apparent. After the valve assembly 10 is mounted on the water tank 80 and the valve base 12 mounted on a structure such as the extractor 27, the tank 80 is filled with water. The poppet valve stem 18 is then closed against the valve body 10 (FIG. 3) due to the expansive force of spring 20 so that no water escapes from the tank. Water pressure due to the water column holds the duckbill valve shut. The water tank 80 is then mounted down over the valve base 12 so that the upwardly extending boss 39 on it (actuating stem), drives the poppet valve stem 18 upwardly within the valve body 22, compressing the spring 20 and moving the conical sealing surfaces 48 and 92 on the poppet valve stem 18 and valve body 22, respectively, apart. The valve assembly 10 is then open (FIG. 2). The fluid contained in the tank 80 is conditioned to flow outward through the volume between the inner cylindrical wall of the bore 84 of valve body 22 and the outer cylindrical wall of stem portion 46 of poppet valve stem 18. From there fluid flows into the arcuate groove 40 and channel bore 42 of valve base 12 to the distribution tube 32.

Figure 4:
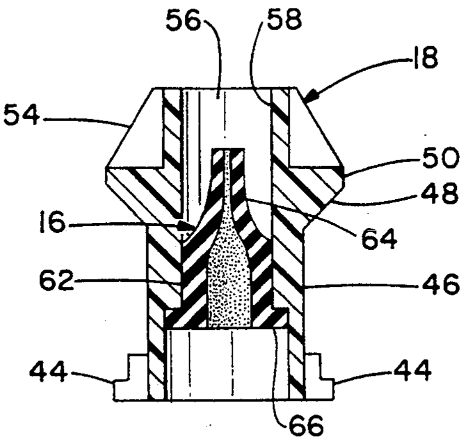
FIG. 4 is a medial cross-sectional view of the poppet valve stem and open duckbill valve.
Figure 5:
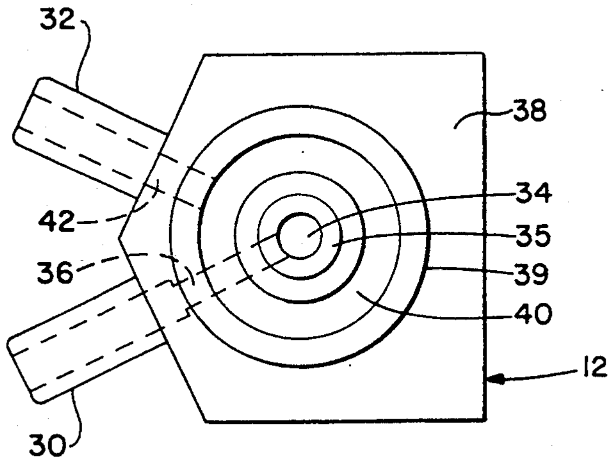
FIG. 5 is a top plan view of the valve base showing its fluid channels.

The duckbill valve 16 remains closed when the water tank 80 is mounted in the valve base 12, since the force of fluid in this tank tends to keep the duckbill portion of duckbill valve 16 closed. It, thus, acts as a check valve. Then, little or no water or fluid escapes from tanks 80 due to gravity unless positive pressure is applied to tank 80. This occurs through the supply of pressurized air or other gas through tube 30 and center bore 34 of nipple-like member 35 of valve base 12. This pressurized gas then passes up through the through bore 68 in duckbill valve retainer 14 and into duckbill valve 16. Pressure forces the duckbill portion 64 of the valve open (FIG. 4) supplying pressurized gas to tank 80 and with the aid of gravity forcing fluid out of the valve assembly 10.

The tank 80, preferably, may be mountingly held in some manner on the structure with which it and valve base 12 are associated. One such arrangement is shown in U.S. Application Ser. No. 07/851,318, filed Mar. 16, 1992 and now abandoned in favor of a Continuation Application, U.S. Application Ser. No. 08/084,354, filed Jun. 28, 1993, now U.S. Pat. No. 5,299,608. In it a water or fluid tank can be seen latched to an extractor body in FIG. 1.

It should be clear from the foregoing description that the invention fully satisfies all the objects set out for it in the beginning portion of the Specification. It should also be clear that many modifications could be made to it which would fully fall within its spirit and purview.

What is claimed is:

1. A valve assembly including:

a) a first valve having an axially extending valve stem operative to permit and interrupt a fluid therethrough:

b) said valve stem moving outwardly away from an outer sealing surface on said valve assembly to permit said fluid flow therethrough;

c) a check valve disposed centered and axially aligned within said valve stem of said first valve to limit fluid flow therethrough;

d) said valve stem is formed of non elastomeric material;

e) said check valve is a duckbill valve;

f) said valve assembly includes a base for said valve having a nipple fixed therein; and g) said nipple confluently communicates with said duckbill valve.

2. The valve assembly as set out in claim 1 wherein:

a) said valve stem includes a through bore; and b) said check valve is mounted in said valve stem throughbore.

3. The valve assembly of claim 1 wherein:

a) said first valve and said duckbill valve, when open, confluently communicate with one another.

4. A valve assembly according to claim 1 wherein:

a) said valve assembly includes a spring; and b) said spring urges said outer and confronting sealing surfaces into said sealing engagement.

5. A valve assembly including:

a) a valve housing;

b) a reciprocating valve stem mounted to extend in an axial direction in said valve housing and sealing and unsealing with said valve housing to permit a fluid flow therethrough in a first direction:

c) a second valve disposed to extend in said axial direction in said valve stem and permitting and interrupting a second fluid flow therethrough in a second direction;

d) said second valve preventing a fluid flow therethrough in said first direction;

e) said valve assembly includes a base;

f) said valve housing being mountable on said base; and g) a projection on said base engageable with said valve stem when said valve housing is mounted on said base to move said valve stem to unseal said valve stem relative to said valve housing and permit said fluid flow in said first direction.

6. A valve assembly attached to a bottom of a fluid containing tank having an opening and including:

a) a first valve attached to said tank;

b) said first valve attached at said tank opening of said tank when said first valve is attached to said tank;

c) a valve base attachable to an extractor;

d) said first valve having structure abuttable with said valve base when said tank is mounted on said extractor;

e) said tank when mounted on said valve base on said extractor having said abuttable structure engaging said valve base to thereby open said valve and provide a fluid flow in a first direction; and f) a second valve disposed within said first valve and providing a second fluid flow in a second direction.

* * * * *